INVENTORS
L. E. KUNTZ
D. M. VESPER

ATTORNEYS

July 16, 1968 L. E. KUNTZ ETAL 3,392,589
SPECIFIC GRAVITY MEASUREMENT SYSTEM
Filed May 13, 1965 2 Sheets-Sheet 2

INVENTORS
L. E. KUNTZ
D. M. VESPER
BY
Young & Quigg
ATTORNEYS

United States Patent Office 3,392,589
Patented July 16, 1968

3,392,589
SPECIFIC GRAVITY MEASUREMENT SYSTEM
Louis E. Kuntz and Daniel M. Vesper, Bartlesville, Okla., assignors to Phillips Petroleum Company, a corporation of Delaware
Filed May 13, 1965, Ser. No. 455,493
12 Claims. (Cl. 73—449)

ABSTRACT OF THE DISCLOSURE

Specific gravity of a stream of liquid is continuously measured by a hydrometer in a constant level hydrometer float chamber. Movement of the hydrometer responsive to variations in specific gravity varies an electrical capacitance, generating a signal representative of the density of the liquid.

This invention relates to the measurement of density or specific gravity of liquids. In one aspect, it relates to the measurement of density by a hydrometer operated capacitance measuring circuit. In another aspect, it relates to continuous measurement of the density of a fluid stream by means of a recording hydrometer operated circuit. In another aspect, it relates to a specific gravity measuring device which compensates electrically for temperature variations of the fluid being measured. In still another aspect, it relates to the continuous determination of the density of a liquid and the computing of the determined density over a period of time, which computation can include the volume of liquid being handled. In yet another aspect, it relates to the continuous measurement of density of a hydrocarbon stream containing water separable by gravity.

There are many applications, particularly in the oil industry, where it is desirable or necessary to know the specific gravity or density of a liquid being handled. The price of crude oil is in part determined by the specific gravity (API gravity) of the oil. When oil is sold from a producing lease, one of the measurements made at the time of the sale is the API gravity of the oil. In the past, this has been done by removing a sample of the crude oil from a storage tank and immersing a hydrometer in the sample. The indicated gravity is obtained visually by reading the hydrometer and at the same time the temperature of the sample is obtained from a thermometer. From tables previously prepared, it is then possible to determine the corrected gravity which in the case of crude oil is corrected to a temperature of 60°. Thus, the gravity of crude oil is expressed symbolically as sp. gr. 60°/60° F. In the United States crude oil and similar hydrocarbons such as refined products of crude oil are usually measured in terms of °API. The relationship between °API and specific gravity is shown by the following formulae:

$$\text{Sp. gr. } 60°/60° \text{ F.} = \frac{141.5}{131.5 + °\text{API}}$$

or, $$°\text{API} = \frac{141.5}{\text{Sp. gr. } 60°/60° \text{ F.}} - 131.5$$

As used hereinafter in this specification the word "gravity" will refer to °API.

There are numerous product pipe lines carrying various refined products from point to point in the United States. These pipe lines carry batches or slugs of differing products in such a manner that at a given time there may be within the overall length of the pipe line several different products, for example, gasoline, butane, kerosene, jet fuel, and propane among others. The gravity of each of these products will be different. Since it is necessary to know the time at which the interface between two different products passes a given point, one method of locating the interface is to sample the stream and note the change in specific gravity as the interface passes.

Since the specific gravity of a crude oil or partially refined crude oil will in part be an indication of the components of the oil, information concerning the gravity can be used to control a process. For example, monitoring the feed stream to a cat cracker will give an indication of any change in feed composition and thus allow adjustments in the operation of the cracking operation.

The prior art discloses methods for the continuous measurement of specific gravity of flowing streams. U.S. Patent 2,416,808, for example, discloses a hydrometer immersed in a constant level overflow device, with the depth of immersion of the hydrometer changing the capacitance of an electrical measuring circuit. An apparatus of this type, however, will give erroneous results if the temperature of the product stream varies. It furthermore makes no provision for returning the diverted sample stream to a product line operating at increased pressures. By means of our invention, these defects are remedied.

From the foregoing, it will be seen that the determination of gravity of an oil finds many applications in the oil industry. It is further apparent that other liquids can be handled in much the same manner. For absolute accuracy in determining the gravity of a given quantity of liquid, it would be necessary to have an infinite number of samples and to average the results of all gravity determinations. The usual practice in the past has been to take only a small number of samples and thus some error can be introduced. The present invention is capable of continuous monitoring and thus approaches absolute accuracy in its results.

Accordingly, it is an object of the invention to provide method and apparatus for the continuous determination of the gravity of a liquid. It is another object to continuously determine the gravity of a liquid and to correct the same to standard conditions. It is yet another object of the invention to record the temperature corrected gravity of the liquid being monitored. Still another object of the invention is to provide method and apparatus for measuring the gravity of a liquid and correcting the measured gravity to standard conditions and to calculate or compute the thus measured gravity in such a manner that it can be related to total volume of liquid handled in the system. It is a further object of this invention to measure the density of a stream consisting of admixed oil and water.

Thus, according to our invention, the capacitance of a capacitor is caused to be varied by a hydrometer in relation to its depth of immersion in a sample fluid, and that capacitance is translated into an electrical signal which is directly related to the specific gravity of the fluid. Means are provided for measuring the temperature of the fluid and correcting the electrical signal for any variations from standard temperature. Flowing streams can be constantly monitored by our method by introducing the stream into a constant level device. Water and heavy contaminants which are separable by gravity from the product stream to be measured are removed from the bottom of the measuring chamber, and are thereby prevented from accumulating and affecting the hydrometer reading.

Other aspects, objects, and advantages of the invention will become apparent upon a reading of the specification and the drawing in which.

Figure 1:
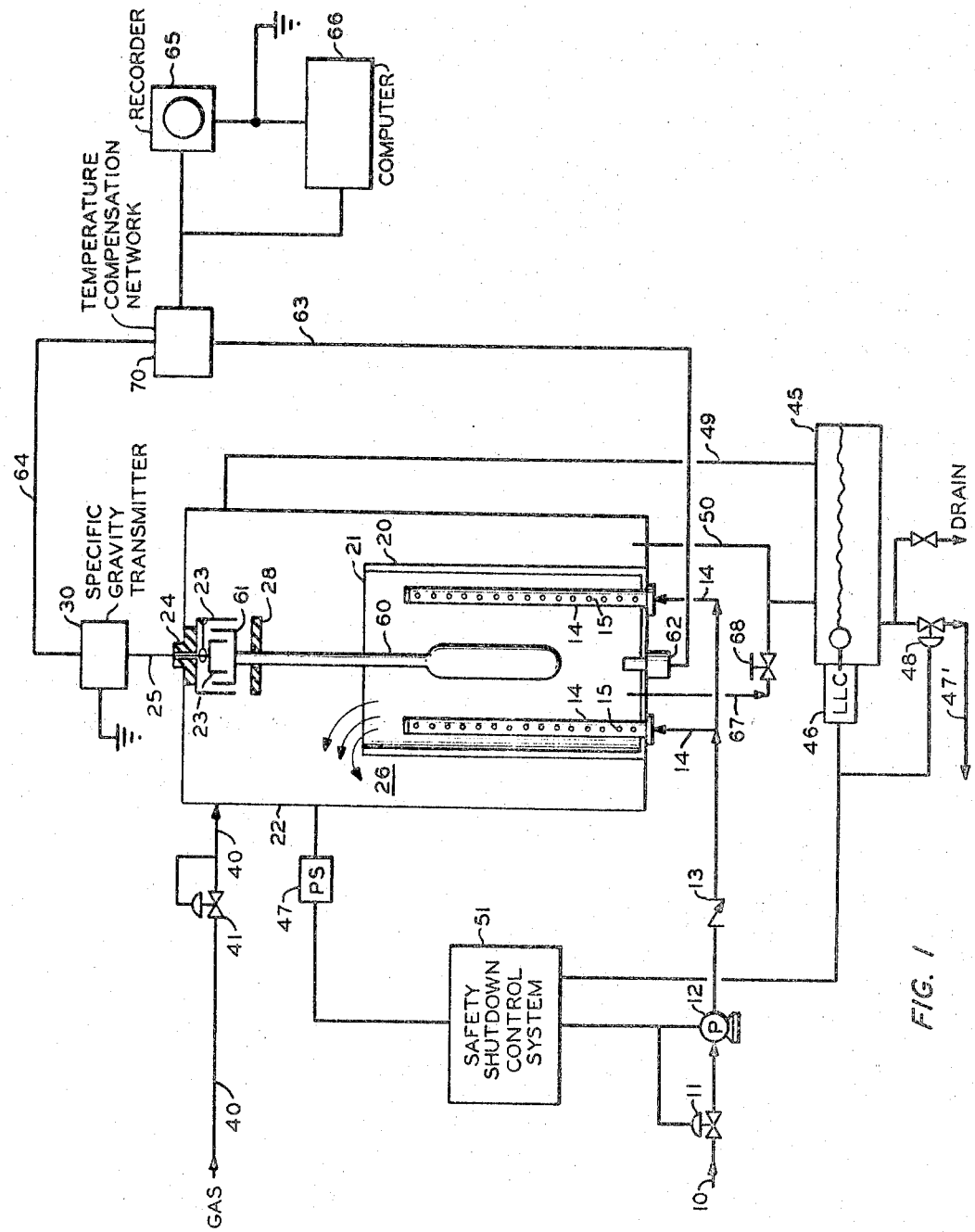
FIGURE 1 is a schematic of the overall system.

Referring to FIGURE 1, a sample is drawn from a source of supply such as a tank or a pipe not shown and enters the apparatus by way of conduit 10 and valve 11; passes through pump 12 and check valve 13, where the stream is split to enter pipes 14. Pipes 14 may terminate at the bottom of the measuring chamber or as shown can extend upwardly through at least a portion of the length of the chamber. In order to reduce turbulence in the chamber, pipes 14 have closed upper ends and a series of apertures or perforations 15 in the sides so that liquid entering is distributed uniformly throughout the approximate center of the chamber. Chamber 20 is closed at its lower end but open at the top. The open top 21 constitutes a weir over which the liquid passes. Since pump 12 will supply a constant flow of liquid to the chamber, weir 21 provides a means whereby the liquid level in the chamber will remain constant. Chamber 20 is contained within a housing 22 which as shown is entirely enclosed and pressure tight. Mounted at the top of housing 22 are a pair of capacitor plates 23. These plates are mounted with suitable electrical insulation 24 so that changes in capacitance as hereinafter described can be carried by way of electrical conduit 25 to transmitter 30.

The annular space 26 between chamber 20 and housing 22 provides a space into which the liquid can fall after it flows over weir 21. Gas is admitted by way of pipe 40 and regulated to a pressure suitable for the particular installation by regulator 41. Regulator 41 maintains a constant pressure within the housing of, for example, 15 pounds per square inch. Gas pressure in the housing 22 is applied to the top of sump 45 by pipe 49, thus liquid accumulating in 26 and 21 flows by gravity into sump 45 through pipes 50 and 67, respectively. The pressure on the top of sump 45 forces accumulated liquid therein out the bottom through a valve in the drain, and through valve 48 and pipe 47'. A hydrometer 60 is placed inside chamber 20 and if desired may be centered by suitable spacers or rings not shown. At the top of the stem of the hydrometer there is a dielectric element 61 which lies between the plates 23 of the capacitor. Since the liquid level in chamber 20 is constant because of the overflow at the weir, any movement up or down of the hydrometer will be occasioned by a change in the gravity of the liquid in the chamber. Movement of the hydrometer will change the position of dielectric 61 with respect to the capacitor plates 23 and change the capacitance thereof. This change in capacitance is sensed by a translating unit or transmitter 30 which translates the change in capacitance to an electrical output signal representative of the gravity of the liquid.

Temperature sensing element 62 in the bottom of chamber 20 measures the temperature of the liquid in the chamber and presses this information by way of circuit 63 through a temperature compensation unit 70 to be described later. Transmitter 30 also passes a signal by way of circuit 64 to unit 70 where the two signals are converted to a signal representative of the gravity corrected to standard conditions. As shown, the output from unit 70 can be passed to a recorder 65 or to a computer 66.

A mechanical stop 28 is provided below plates 23 and dielectric element 61 to limit the downward travel of the hydrometer 60. The lower limit of travel represents minimum capacitance between plates 23. Stop 28 can be supported from the top or side walls of housing 22.

In the bottom of chamber 20 there is provided a drain line 67 and a valve 68. Drain 67 and drain 50 discharge into a sump 45. The purpose of drain 67 is to eliminate any heavy liquids such as water from the bottom of the chamber. To that end valve 68 may be opened only part way or may be equipped with a fixed orifice so that only a portion of the liquid entering chamber 20 is withdrawn in this manner. Sump 45 is provided with a liquid level control 46 which is adapted to control a valve 48 in discharge line 47'. Discharge line 47' returns the liquid to the source of supply. Sump 45 is also provided with a pressure equalizing line 49 which connects the top of the sump with the top of housing 22. Thus, gas pressure from housing 22 is available to force liquid from the sump to further utility.

A safety shutdown control system shown at 51 is also provided. Control 51 receives a signal from the liquid level control 46 and also receives a signal from pressure shutdown switch 47. In the event the liquid level in sump 45 becomes too high or too low, control 51 will operate to close valve 11 and to shut down pump 12. In the event pressure within housing 22 becomes excessively high or excessively low, pressure switch 47 will actuate control 51 to close valve 11 and shutdown pump 12. Control 51 is not illustrated in detail but is conventional as will be understood by those skilled in the art.

Figure 2:
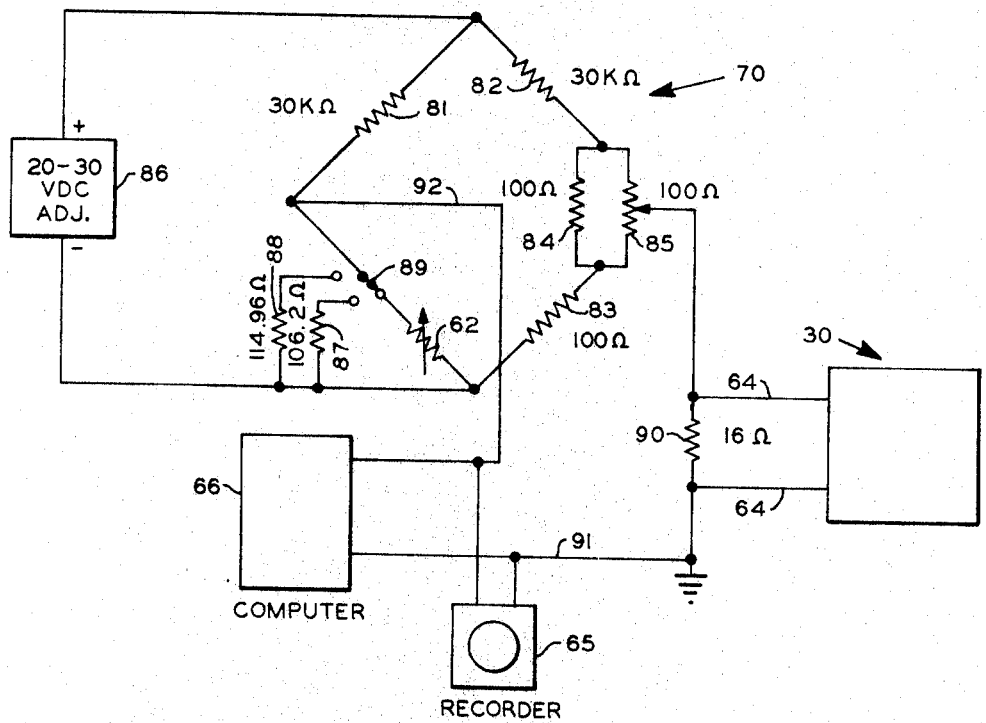
FIGURE 2 is a schematic diagram of the temperature compensation network of the system.

The temperature compensation unit is shown in FIGURE 2. Temperature compensation unit 70 is a conventional resistance bridge circuit and is shown with resistance values that have been found useful in one installation of the apparatus. It is to be understood that other resistance values could be used and those shown are for illustrative purposes only. The bridge is made up of resistance legs 81, 82 and legs 83, 62. A temperature adjustment or zeroing adjustment network is provided by resistors 84 and 85 as well be explained hereinafter. A source of DC voltage for supplying power to the temperature compensating unit is shown at 86 with the positive terminal being connected to an upper corner of the bridge, the negative terminal being connected to an opposite corner of the bridge. Variable resistance 62 is the temperature sensing element 62 shown in FIGURE 1. Resistance 62 is of the type that changes its resistance value with change in temperature. Resistance 62 will have a nominal value of 100 ohms. to match or balance with resistance 83. However, resistance 62 will have an actual resistance of 106.2 ohms at 60° F. and 114.96 ohms at 100° F. These different resistance values provide a ready means of calibration of the instrument and for that purpose resistances 87 and 88 are provided.

In operation the output of specific gravity transmitter 30 is impressed on resistance element 90 and, because a current representative of the capacitance of capacitors 23 is impressed upon resistance 90, a voltage drop will be produced across that resistance proportional to the current and hence proportional to the capacitance. This voltage represents the specific gravity of the hydrocarbon stream flowing through chamber 20 uncorrected for temperature. Simultaneously, resistance 62 will change its value to be representative of the actual temperature of the sample being measured, causing an unbalance of the bridge to result in a second potential being applied to resistance 90. This second potential corrects the output potential of the specific gravity transmitter such that the new electrical signal represents specific gravity corrected for the actual temperature of the sample. The latter signal can be fed to recorder 65 or to a computer 66 or both the recorder and computer.

Figure 3:
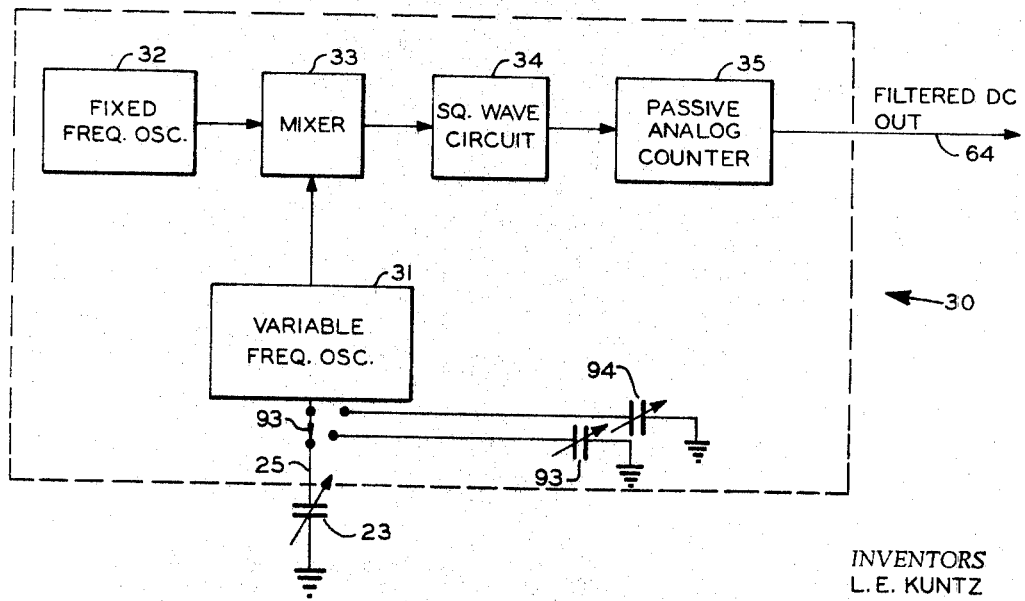
FIGURE 3 is a schematic diagram of the specific gravity transmitter of FIGURE 1.

Transmitting unit 30 is shown schematically in FIGURE 3. As shown the capacitor plates 23 of the hydrometer are connected by line 25 to a variable frequency oscillator 31. A fixed frequency oscillator 32 is used as a reference and the output of oscillators 31 and 32 is fed to a mixer 33 where the difference frequency is obtained and fed to a square wave circuit 34. Square wave 34 will have an output of constant amplitude at a frequency representative of the difference frequency generated in the mixer. The output of the square wave circuit is fed to a passive analog counter where it is converted to a filtered DC current which can be, for example, .1 to 1.1 milliamperes and this current is representative of the capacitance measured in capacitor 23.

The filtered DC is fed by way of line 64 to the temperature compensating unit 70 as previously described. Circuit variables, not shown, may be used to adjust transmitter 30 to give the desired current output which in the example used here is 0.1 milliampere for the hydrometer float in its lowest position (minimum capacitance) and 1.1 milliamperes for the float in its highest position (maximum capacitance). Switch 93 provides means for introducing known capacitances 94 and 95. The variable capacitors 94 and 95 are adjusted to two different capacitances which correspond to two gravities within the range of the hydrometer system.

Calibration of the instrument is relatively simple. The calibration can be carried out by laboratory procedures and also be performed in the field.

The first step is that of checking the signal output of transmitter 30 so that the desired current output is obtained when the float is in the lowest and highest positions. The current thus measured is 0.1 milliampere and 1.1 milliamperes respectively for the particular example used here. This current output will be a function of the displacement of the hydrometer float and hence of the capacitance of capacitor 23. The relationship between current output and capacitance is linear. Internal adjustment can be made in transmitter 30 to insure the proper output current.

Variable capacitors 94 and 95 are adjusted to correspond to capacitance of capacitor 23 if known gravities of liquid were introduced into the chamber 20. For example, if the instrument was to be calibrated to determine the gravity of liquid which would vary between 40° API and 45° API and the transmitter calibrated so that, .1 milliampere output represented 45° API and 1.1 milliamperes output represented 40° API, then the two variable capacitors 94 and 95 might be adjusted to give an output of the transmitter 30 of .2 milliampere and 1.0 milliampere respectively. These outputs would then represent 44.5° API and 40.5° API, respectively.

By using the variable capacitors 94 and 95 which represent known gravities, and resistors 87 and 88 which represent known temperatures, the temperature compensation network 70 can be calibrated for set conditions by adjusting resistor 85 for zero setting and by adjusting power supply 86 for the span or sensitivity setting. Once all adjustments are made, the instrument will operate thereafter with little need for further adjustment.

The relationship between the specific gravity of the liquid and the resulting capacitance of capacitor 23 is linear. However, in the petroleum industry, fluid densities are often expressed in degrees API gravity; this scale is not linear with specific gravity but over short ranges (such as 10° API) the relationship is so nearly linear that the specific gravity monitor can be given a straight line calibration in degrees API with no appreciable error.

Computer 66 can be of any desired type according to the use to which it is to be put. It may be either an analog or a digital computer and its output used to control a variable and a plant process. Also, computer 66 can be of a totalizing type or an averaging computer. In the latter two instances, the figures generated by the computer can be used by an operator to sum up operations over a period of time, such as an hour or a day, etc.

Reasonable variation and modification are possible within the scope of the disclosure, the drawing, and the appended claims to the invention; the essence of which is that a product stream is continuously sampled, separated into heavier and lighter phases, and the specific gravity of the lighter phase corrected to standard conditions is measured and continuously recorded by the novel method and apparatus of this invention. In a preferred embodiment, a small portion of a hydrocarbon stream flowing in a pipeline is diverted to the apparatus of our invention where water and heavy contaminants separable by gravity are separated, and the gravity of the product stream is measured, corrected to standard conditions, and recorded.

W claim:

1. Apparatus for continuously determining the specific gravity of a product stream containing intermingled lighter and heavier phases, comprising a product supply conduit communicating with a hydrometer float chamber wherein said lighter and said heavier phases separate, an overflow weir in said hydrometer float chamber whereby constant liquid level is maintained in said chamber, a hydrometer in said chamber, an electrical capacitance variable by said hydrometer in relation to the depth of immersion of said hydrometer in the liquid in said float chamber, means for translating said capacitance to a signal representative of the density of said liquid, and means for removing said separated heavier phase from said float chamber below the level of said hydrometer.

2. The apparatus of claim 1 wherein the heavier phase is removed by means of an adjustable valve in the lower portion of said float chamber.

3. The apparatus of claim 1 wherein said apparatus is enclosed in a pressure tight housing.

4. Apparatus of claim 1 further including temperature sensing means immersed in said product stream, means for translating the sensed temperature to an electrical signal, means for combining this temperature generated signal with said signal representative of the density of said liquid to form a third signal representative of the specific gravity of said liquid at a predetermined temperature.

5. Apparatus for measuring specific gravity of a liquid product stream containing intermingled lighter and heavier phases comprising:
  (a) a supply conduit for supplying the said liquid to a hydrometer float chamber;
  (b) a specific gravity measuring vessel comprising,
    (1) a hydrometer float chamber having a closed lower end and an open upper end, said upper end constituting an overflow weir;
    (2) a capacitance element mounted in spaced relationship above the top of said chamber;
    (3) A hydrometer inside said chamber, said hydrometer having an elongated stem extending above said weir, said stem being surmounted by a dielectric element for cooperating with the said capacitance element to vary the capacitance thereof in relation to movement of said hydrometer;
  (c) a translating means for translating capacitance to a signal representative of specific gravity, said translating means being connected to said capacitance element, and
  (d) a valve at the bottom of said chamber adapted for the removal of the heavier phase.

6. Apparatus for measuring specific gravity of a liquid comprising:
  (a) a supply conduit for supplying the said liquid to a hydrometer float chamber;
  (b) a specific gravity measuring vessel comprising,
    (1) A hydrometer float chamber having a closed lower end and an open upper end, said upper end constituting an overflow weir;
    (2) a capacitance element mounted in spaced relationship above the top of said chamber;
    (3) a hydrometer inside said chamber, said hydrometer having an elongated stem extending above said weir, said stem being surmounted by a dielectric element for cooperating with the said capacitance element to vary the capacitance thereof in relation to movement of said hydrometer;
    (4) a valve at the bottom of said chamber for removal of heavy immiscible liquids and sediment;
    (5) temperature sensing means in said chamber;

(c) means connected to said capacitance element for translating capacitance to a first signal representative of the specific gravity of said liquid;

(d) means fore translating the sensed temperature to a second signal representative of the temperature of said liquid; and (e) means for combining said first and said second signals to produce a combined signal representative of the specific gravity of said liquid at a standard temperature.

7. Apparatus for continuously determining the specific gravity of a product stream containing water and heavy contaminants separable by gravity, comprising a product supply conduit communicating with a hydrometer float chamber wherein stream and contaminants separate an overflow weir in said hydrometer float chamber whereby constant liquid level is maintained in said chamber, a hydrometer in said chamber, an electrical capacitance variable by said hydrometer in relation to the depth of immersion of said hydrometer in said stream, means for translating said capacitance to a signal representative of the density of said stream, and means for removing said separated contaminants from said float chamber below the level of said hydrometer.

8. Apparatus for continuously determining the specific gravity of a product stream containing intermingled lighter and heavier phases, comprising a product supply conduit communicating with a hydrometer float chamber wherein said lighter and said heavier phases separate an overflow weir in said hydrometer float chamber whereby constant liquid level is maintained in said chamber, a hydrometer in said chamber, an electrical capacitance variable by said hydrometer in relation to the depth of immersion of said hydrometer in the liquid in said float chamber, means for translating said capacitance to a signal representative of the density of said liquid, means for removing said separated heavier phase from said float chamber below the level of said hydrometer, temperature sensing means immersed in said product stream, means for translating the sensed temperature to an electrical signal, means for combining this temperature generated signal with said signal representative of the density of said liquid to form a third signal representative of the specific gravity of said liquid at a predetermined temperature, and an outer pressure tight housing enclosing said apparatus, a gas pressure inlet to said housing, and a product outlet means whereby said product stream is forced from said apparatus by means of said gas pressure.

9. Apparatus for measuring specific gravity of a liquid product stream containing intermingled lighter and heavier phases comprising:
(a) a supply conduit for supplying the said liquid to a hydrometer float chamber;
(b) a specific gravity measuring vessel comprising,
 (1) a hydrometer float chamber having a closed lower end and an open upper end;
 (2) an overflow weir in said hydrometer float chamber whereby liquid level in said hydrometer float chamber is maintained constant;
 (3) a capacitance element mounted in said vessel;
 (4) a hydrometer inside said chamber, said hydrometer having an elongated stem extending above said weir, said stem being operatively connected to a dielectric element for cooperating with said capacitance element to vary the capacitance thereof in relation to movement of said hydrometer;
(c) a translating means for translating capacitance to a signal representative of specific gravity, said translating means for being connected to said capacitance element, and
(d) means in a lower portion of said chamber adapted for the removal of the heavier phase.

10. The apparatus of claim 9 further comprising an outer pressure-tight housing enclosing said apparatus, a gas pressure inlet to said housing, and a product outlet means whereby said liquid is forced from said apparatus by means of said gas pressure.

11. Apparatus for measuring specific gravity of a liquid comprising:
(a) a supply conduit for supplying the said liquid to a hydrometer float chamber;
(b) a specific gravity measuring vessel comprising,
 (1) a hydrometer float chamber having a closed lower end and an open upper end, said upper end constituting an overflow weir;
 (2) a capacitance element mounted in spaced relationship above the top of said chamber;
 (3) a hydrometer inside said chamber, said hydrometer having an elongated stem extending above said weir, said stem being surmounted by a dielectric element for cooperating with the said capacitance element to vary the capacitance thereof in relation to movement of said hydrometer;
(c) a translating means for translating capacitance to a signal representative of specific gravity, said translating means being connected to said capacitance element;
(d) means for sensing the temperature of said liquid and generating a second signal representative thereof; and
(e) means for combining the two said signals to produce a combined signal representative of the specific gravity of said liquid at a standard temperature.

12. The apparatus of claim 11 wherein said means for combining the two said signals comprises a fixed resistor having a first voltage impressed thereon representative of the sensed capacitance, and having a second voltage impressed thereon representative of the variation of the temperature of said liquid from said standard temperature, and means for measuring the sum of the two said voltages.

References Cited

UNITED STATES PATENTS

| 122,174 | 12/1871 | Huntington et al. | 73—220 |
| 2,362,661 | 11/1944 | Peters et al. | 73—452 |
| 2,416,808 | 3/1947 | Weiss | 73—452 |
| 3,216,255 | 11/1965 | McFarlane | 73—313 |

OTHER REFERENCES

Kuntz, Louis E., ISA Journal, volume 7, No. 2, February 1960, p. 43.

RICHARD C. QUEISSER, *Primary Examiner.*

J. D. SCHNEIDER, *Assistant Examiner.*